United States Patent
Solis et al.

(10) Patent No.: US 8,352,737 B2
(45) Date of Patent: Jan. 8, 2013

(54) METHODS, APPARATUSES, AND COMPUTER PROGRAM PRODUCTS FOR AUTHENTICATION OF FRAGMENTS USING HASH TREES

(75) Inventors: John Solis, Irvine, CA (US); Kari Timo Juhani Kostiainen, Helsinki (FI); Philip Ginzboorg, Espoo (FI); Nadarajah Asokan, Espoo (FI); Joerg Ott, Espoo (FI); Cheng Luo, Espoo (FI)

(73) Assignee: Nokia Corporation, Espoo (FI)

( * ) Notice: Subject to any disclaimer, the term of this patent is extended or adjusted under 35 U.S.C. 154(b) by 1041 days.

(21) Appl. No.: 11/961,542

(22) Filed: Dec. 20, 2007

(65) Prior Publication Data

US 2009/0164783 A1  Jun. 25, 2009

(51) Int. Cl.
*H04L 29/06* (2006.01)

(52) U.S. Cl. .......... 713/168; 726/26; 707/693; 707/698; 707/827

(58) Field of Classification Search .................. None
See application file for complete search history.

(56) References Cited

U.S. PATENT DOCUMENTS

| | | | |
|---|---|---|---|
| 7,702,640 B1 * | 4/2010 | Vermeulen et al. | 707/999.1 |
| 8,028,159 B2 * | 9/2011 | Li | 713/150 |
| 2005/0091261 A1 * | 4/2005 | Wu et al. | 707/102 |
| 2005/0114666 A1 * | 5/2005 | Sudia | 713/175 |
| 2006/0090067 A1 * | 4/2006 | Edmonds et al. | 713/159 |
| 2007/0005499 A1 * | 1/2007 | Gentry et al. | 705/51 |
| 2008/0022005 A1 * | 1/2008 | Wu et al. | 709/231 |
| 2009/0157735 A1 * | 6/2009 | Gentry et al. | 707/102 |
| 2009/0259847 A1 * | 10/2009 | Li | 713/168 |
| 2010/0110935 A1 * | 5/2010 | Tamassia et al. | 370/256 |

FOREIGN PATENT DOCUMENTS

WO   WO 2007024970 A2 *  3/2007

OTHER PUBLICATIONS

N. Asokan, et al.; *Towards Securing Disruption—Tolerant Networking*; Mar. 21, 2007; Nokia Research Center NRC-TR-2007-007.
A. Buldas, et al.; *Time-Stamping with Binary Linking Schemes*.

* cited by examiner

*Primary Examiner* — Nathan Flynn
*Assistant Examiner* — Michael R Vaughan
(74) *Attorney, Agent, or Firm* — Alston & Bird LLP

(57) ABSTRACT

An apparatus for authentication of fragments using hash trees may include a processor. The processor may be configured to provide one or more data fragments and a hash tree representing the one or more fragments, send at least one first fragment accompanied by any nodes of the hash tree necessary to authenticate the one or more first sent fragments, and send one or more subsequent fragments accompanied by only some, but not all, of the nodes of the hash tree necessary to authenticate the one or more subsequent fragments with the other nodes that are not sent but are necessary for authentication having been previously sent in conjunction with a prior fragment.

22 Claims, 5 Drawing Sheets

METHODS, APPARATUSES, AND COMPUTER PROGRAM PRODUCTS FOR AUTHENTICATION OF FRAGMENTS USING HASH TREES

TECHNOLOGICAL FIELD

Embodiments of the present invention relate generally to mobile communication technology and, more particularly, relate to methods, apparatuses, and computer program products for authenticating message fragments through the use of hash trees.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the ease of information transfer and convenience to users involves improving the transmission of data over networks.

Although in traditional wireline networks the links between network nodes are generally long-lived, that is not always the case in mobile networking. In the case of mobile challenged networks, such as sensor, ad-hoc, opportunistic or disruption-tolerant networks, some, but not necessarily all, of the links between network nodes may be short-lived. The short-lived nature of some links between nodes may be caused by, for example: (1) network node mobility, such as in an ad-hoc Bluetooth® network comprised of devices temporarily in close proximity to each other which opportunistically form a network; (2) power saving settings, as in low-power devices, such as sensors, which generally stay in sleep mode most of the time and communicate only periodically; or (3) a difficult physical path, such as due to the nature of the terrain or in interplanetary or underwater communication where a communication link may be unreliable due to the long distance or difficult environment.

While such challenged networks might not present a problem in the communication of small amounts of data, today's mobile devices often send and receive large messages, such as, for example multimedia content. The transmission of such large messages presents several problems in challenged networks. For one, it may not be possible to send an entire message over a network link before the link expires. If only part of a message is successfully sent over a link prior to the link going down, when an alternative link between network nodes becomes available it is undesirable to resend portions of the message that have already been successfully sent as that would waste scarce network resources. In addition to problems of failed message transmissions and redundant transmissions leading to wasted network bandwidth, there are also concerns over corrupted data transmissions as well as security concerns as malicious messages designed to extract data from or disable a mobile device may be sent over a mobile network.

Traditionally, concerns over message authentication have been addressed by schemes which assume that messages are sent as one piece. One such scheme of message authentication is to calculate a hash over the entire contents of the message and sign the hash with the sender's private key. The sender then sends the message as one piece along with the signed hash. The receiver, after receiving the message, may then calculate the same hash from the message contents and verify the signature using the sender's public key in order to authenticate the message. This approach works well for traditional wired networks where data connections are reliable and long-lived, but in the case of short-lived wireless networks where it may be impossible to deliver the entire message during the life of the network link there is a need to allow for message fragmentation, which this approach does not support. For example, if the sender or an intermediary device fragments the original message but the receiver only receives a subset of the message fragments, the same hash cannot be calculated. Since the entire message is needed to calculate the same hash, the signature cannot be verified and the entire message will have to be sent again. Thus it is desirable to allow for fragmentation of the message into multiple fragments which may be individually authenticated.

One common approach allowing for fragmentation and individual authentication of each fragment is known as the signature list approach (also sometimes referred to as the toilet paper approach). In this approach a hash is calculated over each fragment and each hash is signed separately before being sent. This approach, however, has several shortcomings. Although the signature list approach allows for message fragmentation, it does not support on-demand fragmentation and reassembly by intermediary nodes. For example, a message may likely traverse several network nodes on a path from the sender to the receiver. Some of these nodes may be linked by reliable, long-lived links over which the entire message may be passed in one piece, while other nodes may be linked by short-lived links over which a message needs to be fragmented to ensure efficient transmission. Since the original sender cannot know whether short-lived links exist along the path the message is going to traverse in the network it is desirable to let each intermediary node individually decide whether the message should be sent to the next node in the path in fragments or in its entirety depending on the network link. Otherwise, if a message is fragmented when all links along the path are long-lived, limited network resources are wasted due to the increased authentication information in the form of attached signatures, which is not really needed. Contrastingly, if the message is not fragmented, but short-lived links exist along the path, network resources are also wasted by possibly having to resend the entire message when a link goes down.

The signature list approach also increases the amount of data that has to be sent over a link. For example, if a message is divided into n fragments $(f_1, f_2 \ldots f_n)$ the message sender has to add n signatures to the message. Since signatures are relatively large, often in the order of one kilobyte or larger, adding n signatures causes a considerable bandwidth overhead. This approach also increases the computational work required by the sender and the receiver as the sender has to compute n signatures and the receiver has to verify n signatures. Signature creation and verification are computationally expensive operations and thus lead to a considerable computational overhead and waste of system resources.

Previously proposed by the inventors of the present invention as an improvement upon the signature list approach is the use of hash trees to authenticate message fragments. In this approach, the sender again divides a message into n fragments $(f_1, f_2 \ldots f_n)$. A hash $h_i$ is then calculated for each fragment $f_i$. Next, the sender constructs a hash tree from all of the fragment hashes $(h_1, h_2 \ldots h_n)$ and creates a signature by signing the root node of the hash tree with its private key.

The sender sends each fragment separately as a self-contained unit by attaching to each fragment the signature and $\log_2(n)$ hashes from the hash tree. The hashes sent with each fragment are selected so that the recipient can recalculate the same hash tree root node after having received the fragment. Thus, for a message divided into 8 fragments, each of the 8 fragments is sent separately accompanied by the signature and 3 hashes from the hash tree. The recipient then authenticates each received fragment independently by calculating the same hash tree root node from the received fragment itself and the received hashes of the hash tree and by verifying the signature on the root node.

This hash tree based approach offers an advantage over the signature list approach in that computational work is significantly reduced as for a message with n fragments the sender only has to create one signature and 2n−1 hashes, whereas in the signature list approach the sender has to create n signatures and n hashes, the creation of signatures being significantly more computationally expensive than the creation of hashes. Also, computational work is reduced on the recipient end since only one signature has to be verified. However, this hash tree based approach presents a disadvantage over the signature list approach in the form of increased bandwidth overhead. In the signature list approach each fragment must be accompanied with one signature, whereas in the hash tree approach each fragment must be accompanied with one signature and $\log_2(n)$ hashes.

Accordingly, it would be advantageous to provide for an improved hash tree approach which allows for on-demand fragmentation of messages and reassembly of fragments but which produces minimum bandwidth overhead while utilizing the low computational overhead of a hash tree based approach.

BRIEF SUMMARY

A method, apparatus, and computer program product are therefore provided to improve the efficiency and reliability with which messages are sent over challenged networks. In particular, a method, apparatus, and computer program product are provided to enable, for example, on-demand fragmentation of messages by intermediary nodes along the transmission path depending on the state of the link over which the message is to be sent and which require only one signature to be generated and sent. In this regard, messages may be sent efficiently without requiring a sender to have prior knowledge of the longevity and reliability of network links the message will traverse on its way to the recipient. Accordingly, messages containing large amounts of data may be reliably sent over even transient ad-hoc networks without overly burdening limited network bandwidth.

In one exemplary embodiment, a method for sending data to a remote device is provided. The method may comprise providing one or more data fragments and a hash tree representing the one or more fragments, sending at least one first fragment accompanied by any nodes of the hash tree necessary to authenticate the one or more first sent fragments, and sending one or more subsequent fragments accompanied by only some, but not all, of the nodes of the hash tree necessary to authenticate the one or more subsequent fragments with the other nodes that are not sent but are necessary for authentication having been previously sent in conjunction with a prior fragment.

In another exemplary embodiment, a computer program product for sending data to a remote device is provided. The computer program product includes at least one computer-readable storage medium having computer-readable program code portions stored therein. The computer-readable program code portions include first, second and third executable portions. The first executable portion is for providing one or more data fragments and a hash tree representing the one or more fragments. The second executable portion is for sending at least one first fragment accompanied by any nodes of the hash tree necessary to authenticate the one or more first sent fragments. The third executable portion is for sending one or more subsequent fragments accompanied by only some, but not all, of the nodes of the hash tree necessary to authenticate the one or more subsequent fragments with the other nodes that are not sent but are necessary for authentication having been previously sent in conjunction with a prior fragment.

In another exemplary embodiment, an apparatus for sending data to a remote device is provided. The apparatus may include a processor. The processor may be configured to provide one or more data fragments and a hash tree representing the one or more fragments, send at least one first fragment accompanied by any nodes of the hash tree necessary to authenticate the one or more first sent fragments, and send one or more subsequent fragments accompanied by only some, but not all, of the nodes of the hash tree necessary to authenticate the one or more subsequent fragments with the other nodes that are not sent but are necessary for authentication having been previously sent in conjunction with a prior fragment.

In another exemplary embodiment, an apparatus for sending data to a remote device is provided. The apparatus may include means for providing one or more data fragments and a hash tree representing the one or more fragments, means for sending at least one first fragment accompanied by any nodes of the hash tree necessary to authenticate the one or more first sent fragments, and means for sending one or more subsequent fragments accompanied by only some, but not all, of the nodes of the hash tree necessary to authenticate the one or more subsequent fragments with the other nodes that are not sent but are necessary for authentication having been previously sent in conjunction with a prior fragment.

Embodiments of the invention may therefore provide a method, apparatus, and computer program product to enhance sending data to a remote device. As a result, for example, networks and network devices may benefit from less wasted bandwidth and less burdensome computational requirements for authenticating messages.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
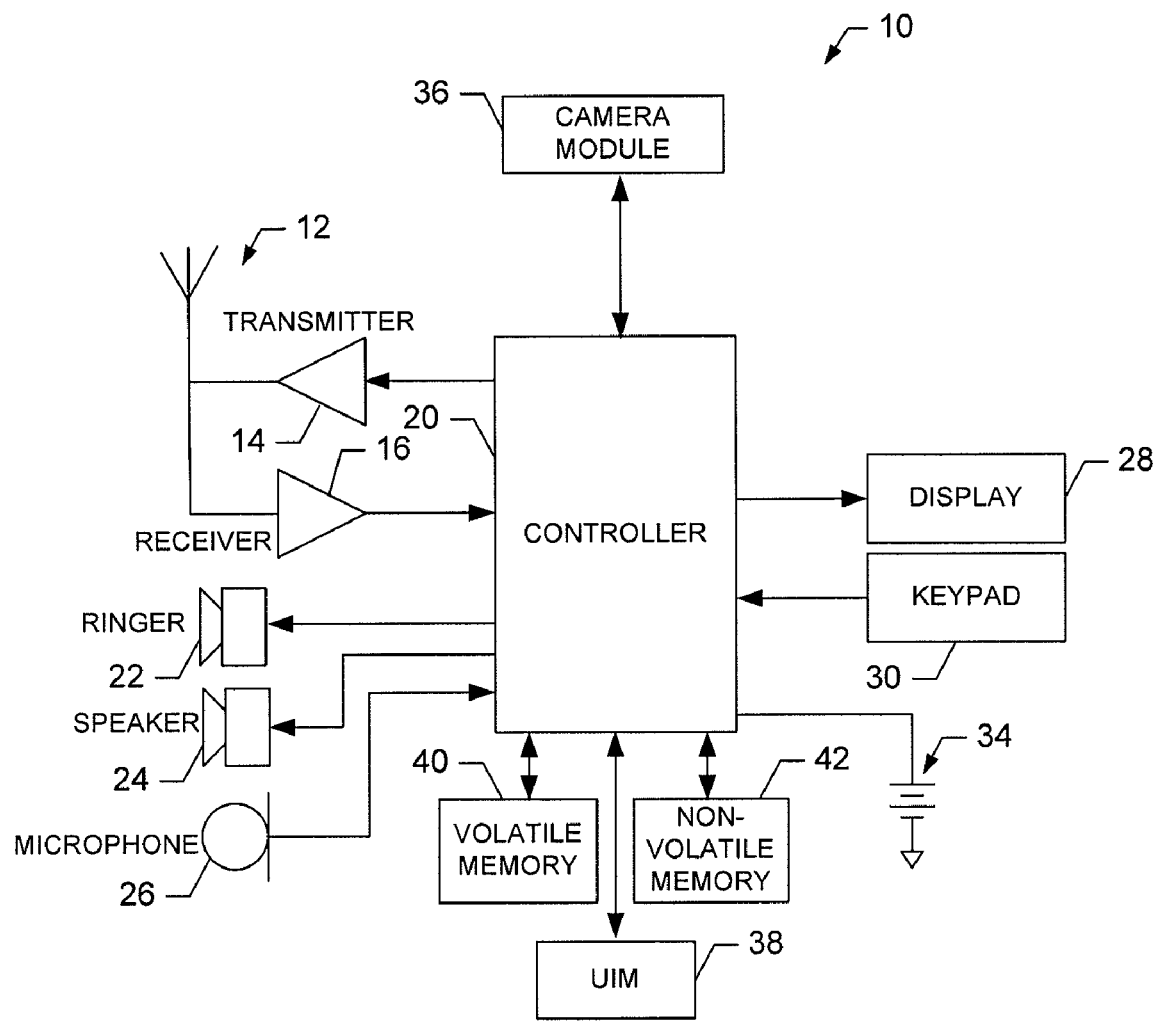
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a processor, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the controller 20 includes means, such as circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

In an exemplary embodiment, the mobile terminal 10 includes a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 36, the camera module 36 may include a digital camera capable of forming a digital image file from a captured image. As such, the camera module 36 includes all hardware, such as a lens or other optical device, and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

Figure 2:
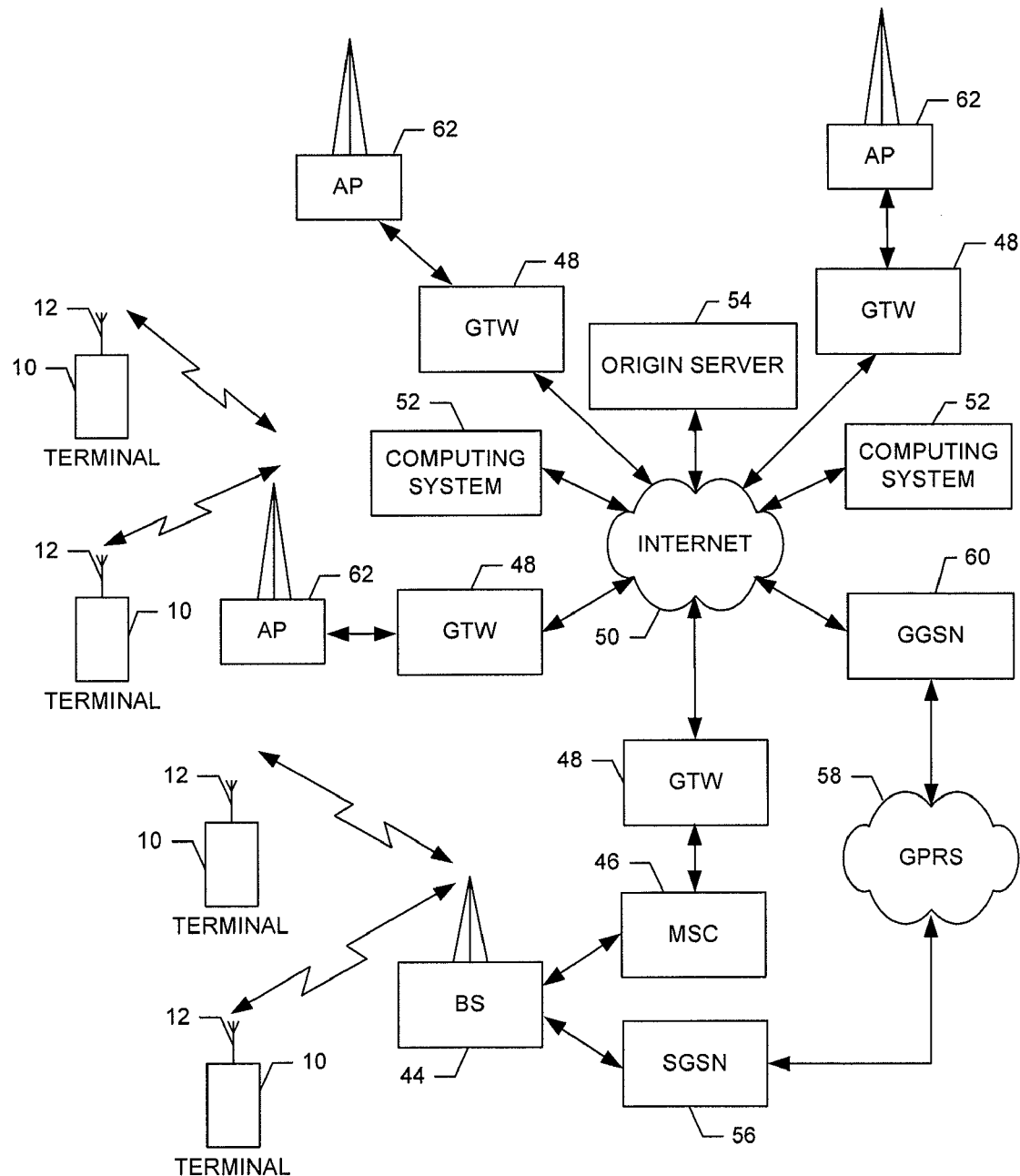
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth® (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like. Additionally, a plurality of mobile terminals 10 may communicate directly with each other via an opportunistic, ad-hoc network, in which communications my be facilitated in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1 and a network device of the system of FIG. 2 in order to execute applications for establishing communication between the mobile terminal 10 and other mobile terminals, for example, via the system of FIG. 2. As used herein, the term "exemplary" merely refers to an example. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a network device such as a server or other device accessible to the communication device.

Figure 3:
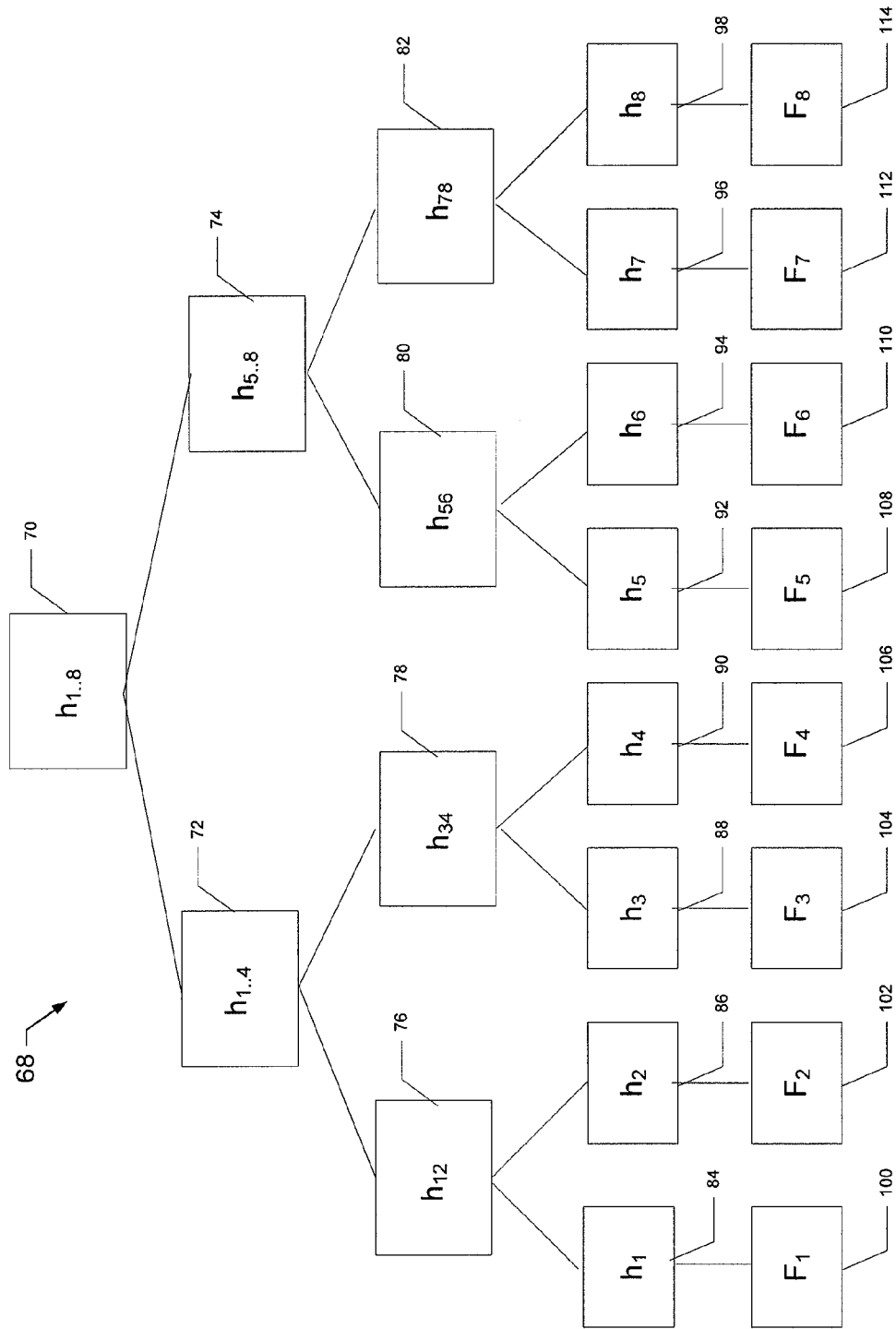
FIG. 3 illustrates a hash tree representing a fragmented message according to an exemplary embodiment of the present invention.

FIG. 3 illustrates a Merkle hash tree 68 representing a fragmented message according to an exemplary embodiment of the present invention. The hash tree 68 will be described, for purposes of example, in connection with the mobile terminal 10 of FIG. 1. However, it should be noted that the hash tree 68 may also be employed in connection with a variety of other devices, both mobile and fixed, and therefore, embodiments of the present invention should not be limited to application on devices such as the mobile terminal 10 of FIG. 1. It should also be noted, that while FIG. 3 illustrates one example of a configuration of a hash tree for representing a fragmented message, other configurations, including non-binary trees as well as trees representing messages divided into fewer or more fragments may also be used to implement embodiments of the present invention.

Referring now to FIG. 3, a hash tree 68 representing a fragmented message to be sent to a remote network device is depicted. According to an exemplary embodiment of the current invention, the original sender device, such as, for example, a mobile terminal 10 may fragment a data message, such as, for example a multimedia file captured by the camera module 36, to be sent to a remote network device, such as any of the devices depicted in the system of FIG. 2 into a plurality of fragments. The number of fragments into which the data message is to be divided may be determined based upon a fixed algorithm, such as, for example, a linear function wherein the number of fragments grows proportionately to the size of the data message or may be based on a dynamic algorithm that takes into account any number of factors, such as, for example, the size of the data message, the known stability of the network, whether the mobile terminal 10 is roaming or in its home network, etc. The algorithm for determining whether to fragment a message and how many fragments to divide a data message into may be embodied in any device or means embodied in either hardware, software, or a combination of hardware and software. For example, the algorithm may be embodied by software with execution of the algorithm controlled by or otherwise embodied as the processor, such as for example the controller 20 of the mobile terminal 10. In the hash tree 68, a message has been divided into 8 fragments $F_{1-8}$ 100-114. From these fragments the sender may hash each fragment, $F_i$, according to a hash function $H(f_i)$ and store the output as $h_i$, such as $h_{1-8}$ 84-98. It will be appreciated that embodiments of the current invention are not reliant on any particular hash function and the hash function(s) used may be chosen from any of several appropriate hash functions well known in the art. The hash function(s) used to form the hash tree 68 and to authenticate fragments may be embodied in any device or means embodied in either hardware, software, or a combination of hardware and software. For example, the hash function(s) may be embodied by software with execution of the hash function(s) controlled by or otherwise embodied as a processor, such as for example the controller 20 of the mobile terminal 10. The sender may then hash the concatenation of two consecutive hashes, e.g. $h_i$ and $h_{i+1}$ storing the output as $h_{i \ldots i+1}$ and recursively hash outputs until one output hash remains. The single remaining output hash is the root node of the hash tree, denoted $h_{1-n}$ or in the case of the hash tree 68, $h_{1-8}$ 70. The sender may then create a signature s by signing the root node $h_{1-8}$ 70 with its private key. The signature creation may be controlled by or otherwise embodied as a processor, such as for example the controller 20 of a mobile terminal 10.

Figure 4:
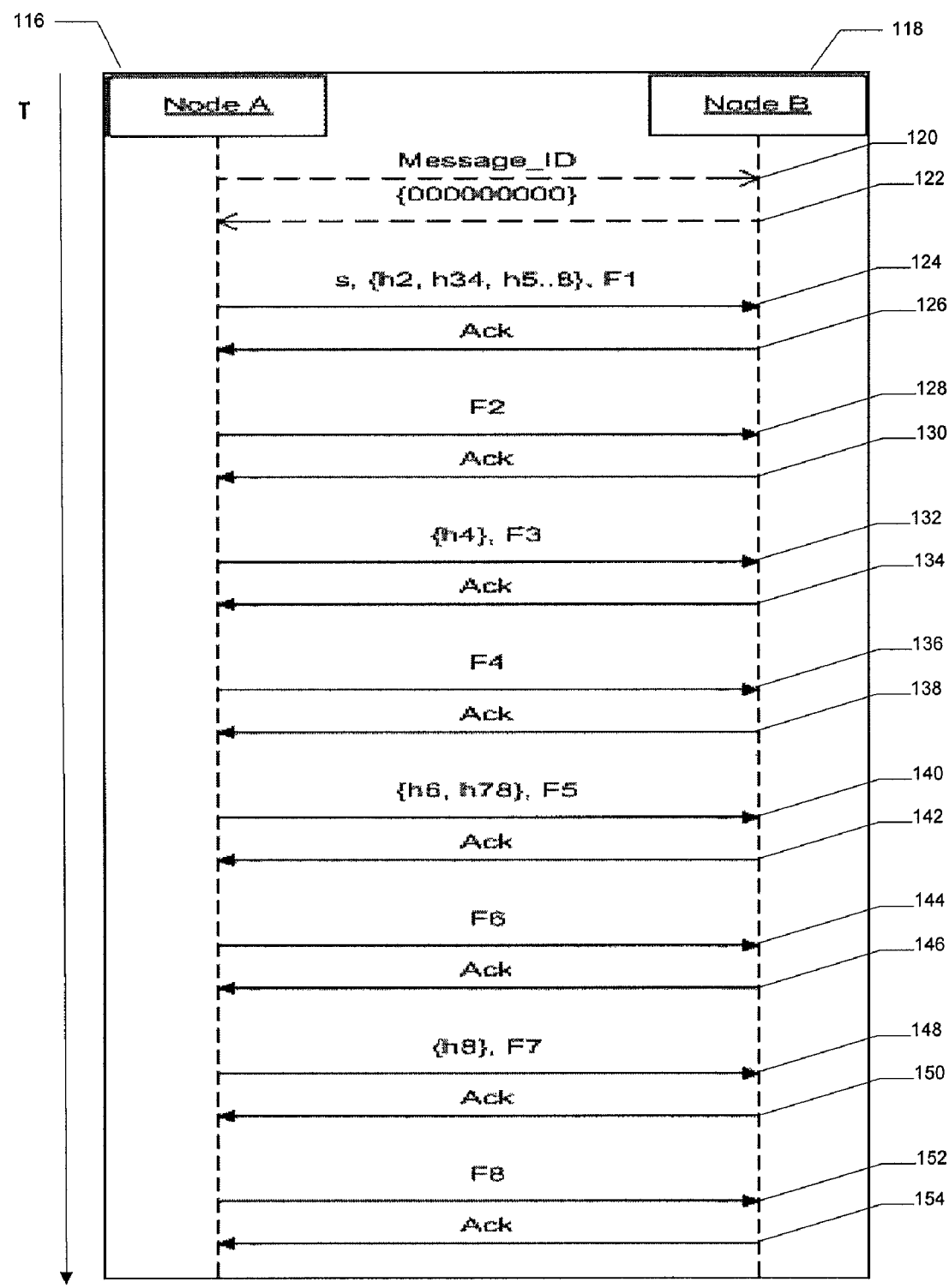
FIG. 4 is a timing diagram depicting the transmission of a message between network nodes according to an exemplary embodiment of the present invention.

After forming a hash tree representing a fragmented message, a sender device may then begin to send a message. Although a sender device may not know the stability of all links that a message will traverse along the route to the ultimate recipient, a sender may know the stability of the link between itself and the next network node. Thus, a sender may decide whether to send a message as a series of fragments or in its entirety based upon a determination of the stability of the link to the next node in the transmission path. This determination may be controlled by or otherwise embodied as a processor, such as for example the controller 20 of a mobile terminal 10. For example, the controller may be configured to execute software which implements this determination. For purposes of example, a sender of a message represented by the hash tree 68 will send the message as a series of 8 fragments. Referring now to FIG. 4 in conjunction with FIG. 3, Node A 116 is a sender device, such as for example, a mobile terminal 10, that is sending a message fragmented into 8 fragments and represented by the hash tree 68 to remote network Node B 118. Node A 116 may optionally send to Node B 118 a Message_ID string 120, which contains an identification reference for the message to be sent. In response to receipt of this string 120, Node B 118 may respond with a bit mask wherein bits representing the signature and fragments of the message that have already been received are set. In this instance, Node B 118 has not yet received either the signature or any fragments of the message and so responds with a transmission 122 of a bit mask set to all 0s. Node A 116 may then send a transmission 124 comprising a first fragment of the message, $F_1$ 100, accompanied by a signature s and the nodes of the hash tree 68 necessary to authenticate the first fragment, in this case $h_2$ 86, $h_{34}$ 78, and $h_{5...8}$ 74. These necessary nodes represent the co-path for $F_1$ 100, or the nodes that in conjunction with $F_1$ 100 enable calculation of the root node $h_{1...8}$ 70 embodied in the signature s and thus enable authentication of $F_1$ 100. Node A 116 may then wait for an acknowledgement 126 from Node B 118 before sending any subsequent fragments. Following receipt of the Ack 126, which indicates that Node B 118 has successfully received the first fragment along with the accompanying signature and hash tree nodes sufficient to verify the fragment, Node A may then proceed with sending a transmission 128 comprising a second fragment $F_2$ 102. In this example, the transmission 128 is not accompanied by any additional hash tree nodes because Node B 118 already has all of the needed information to verify $F_2$ 102 as by hashing the already received $F_1$ 100 and recursively hashing and concatenating the already received hash tree nodes in the co-path for $F_2$ 102, Node B 118 may verify the fragment by calculating the same value as the root node $h_{1...8}$ 70. In this case it is enough to calculate $h2'=H(F_2)$ after receiving $F_2$ 102. Node B 118 may verify $F_2$ 102 by calculating $h2'=H(F_2)$ and verifying that this h2' matches the $h_2$ 86 received with $F_1$ 100 in the first message. Again, Node A 116 may wait for an acknowledgement transmission 130 from Node B 118 acknowledging receipt and verification of the second fragment. Next, Node A 116 may send a transmission comprising $F_3$ 104 and $h_4$ 90, which again is the only node of the hash tree 68 additionally needed to verify $F_3$ 104 as all of the other hashes in the co-path for $F_3$ 104 have already been sent. After receiving an acknowledgement 134 from Node B 118, Node A 116 may send a transmission comprising $F_4$ 106, which does not need to be accompanied by any additional nodes as all of the hashes in the co-path for $F_4$ 106 necessary to verify the fragment have already been sent. Again, Node A 116 may wait for an acknowledgement 138 from Node B 118 acknowledging successful receipt and verification of $F_4$ 106.

Next, Node A 116 may send a transmission 140 comprising $F_5$ 108 and nodes $h_6$ 94 and $h_{78}$ 82, which are necessary to authenticate the fragment. Node B 118 may then send an acknowledgement 142 to Node A 116, which may wait for the acknowledgment 142 prior to sending a transmission 144 to Node B 116 comprising $F_6$ 110, which may be verified by Node B 118 without any additional nodes of the hash tree 68. Node A 116 may then wait for an acknowledgement 146 from Node B 118 acknowledging successful receipt and verification of $F_6$ 110. Next, Node A 116 may send a transmission 148 comprising $F_7$ 112 and $h_8$ 98, which is the only node of the hash tree 68 that has not already been sent and is necessary to complete the co-path for $F_7$ 112 so that the fragment may be verified by Node B 118. Node B 118 may then send an acknowledgment 150 to Node A 116 acknowledging successful receipt and verification of $F_7$ 112. Node A 116 may then send a transmission 152 comprising $F_8$ 114 without sending any nodes of the hash tree 68 as Node B 118 already has all of the hashes necessary to authenticate $F_8$ 114 and may send an acknowledgment 154 upon successful receipt and authentication of the fragment. At this point, the entire message has successfully been communicated from Node A 116 to Node B 118.

It is important to note in the above described example and the diagram depicted in FIG. 4 that Node B 118 may either be an intermediary node or the ultimate recipient node. If Node B 118 is an intermediary node, then Node B may decide either to send a message such as that represented by hash tree 68 as a series of 8 fragments or may send the message in larger combined fragments accompanied by hash tree nodes necessary to authenticate each component fragment and which have not already been sent or as a single transmission accompanied by hash tree 68. Fragmentation decisions and fragment authentication by Node B 118 may be controlled by or otherwise embodied as a processor, such as for example the controller 20 of a mobile terminal 10. It is important to note that while a node such as Node B 118 in the message path may make on-demand fragmentation decisions based upon factors such as the longevity of the link to the next node in the message path, only the original sender of the message, Node A 116 in this example, can make the original fragmentation of the message. Thus a message cannot subsequently be broken down into smaller fragments by an intermediary node than those originally created by the original sender. Additionally, if Node B 118 is an intermediary node it may forward received fragments immediately upon receipt without having to wait for all fragments to be received from Node A 116 since each fragment may be verified individually. Thus the efficiency of the overall network, such as for example the network depicted in the system of FIG. 2, is maximized.

Also of note is that in the embodiment of FIG. 4, an acknowledgement was transmitted by Node B 118 following the receipt of each transmission of a fragment from Node A 116. In alternative embodiments cumulative or negative acknowledgements may be used to reduce the number of acknowledgements sent by the receiver Node B 118 and thus further reduce network bandwidth overhead. The decision on what acknowledgement scheme to use will depend on the protocol implementations using the verification scheme of embodiments of the current invention as the verification scheme described herein acts independently of the acknowledgement scheme used and only requires the ability of network nodes to verify signatures and the implementation of some acknowledgement scheme. If an unreliable short-lived unidirectional link is the only link available then embodiments of the present invention are no longer applicable since a sending node has no way of accurately determining which fragments have been received and the benefit of embodiments of the invention is that all information sent in the scheme is the exact minimum required for computing the root hash 70 of a hash tree 68 representing a message.

Figure 5:
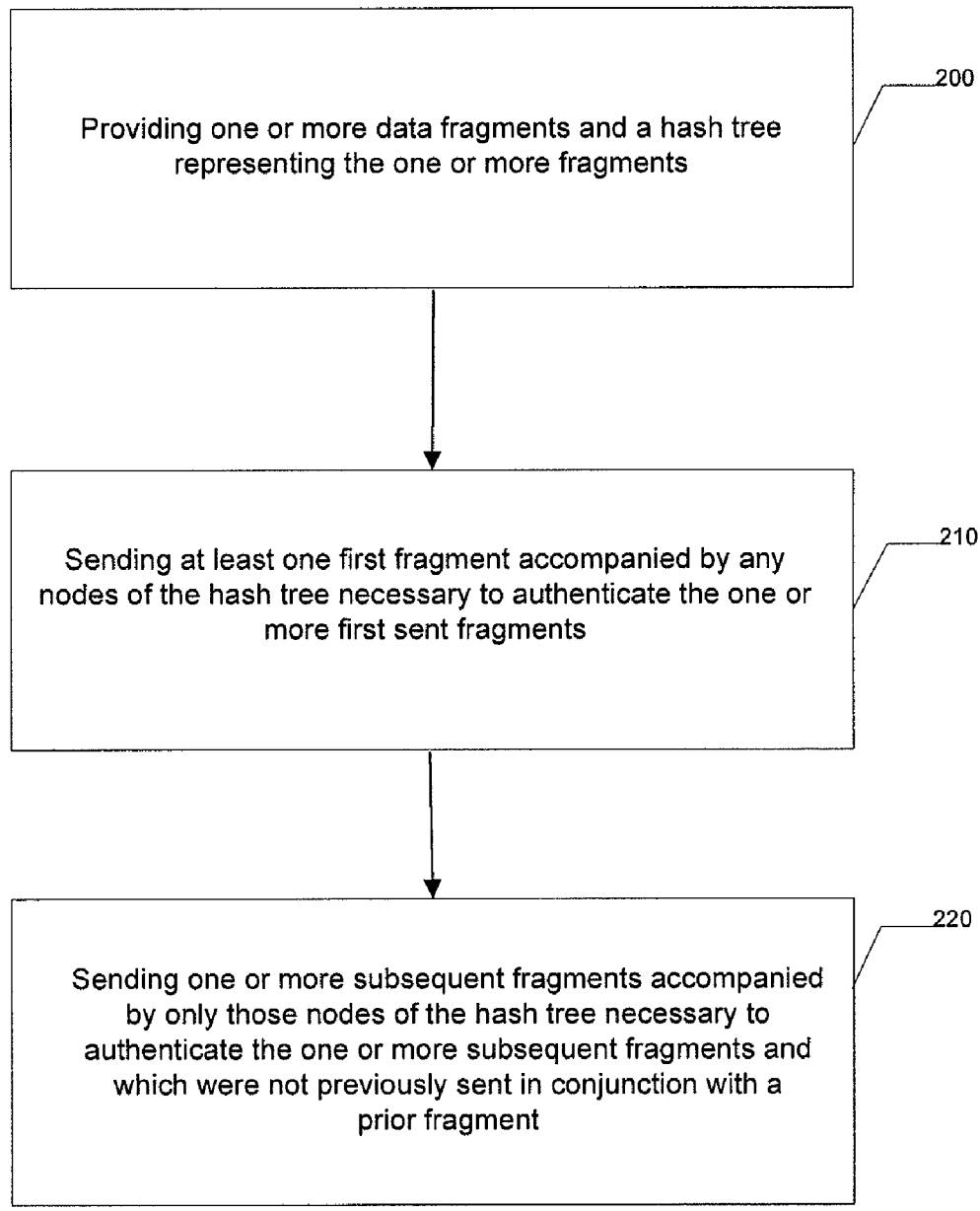
FIG. 5 is a flowchart according to an exemplary method for transmitting data to a remote device according to an exemplary embodiment of the present invention.

FIG. 5 is a flowchart of a method and computer program product according to an exemplary embodiment of the invention. It will be understood that each block or step of the flowchart, and combinations of blocks in the flowchart can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or server and executed by a built-in processor in a mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method of authentication of fragments using hash trees as illustrated in FIG. 5 may include providing one or more data fragments and a hash tree representing the one or more fragments in operation 200. Providing a hash tree may be satisfied either by the original sender node, which determines the size of the smallest fragment and creates the original hash tree or by an intermediary node, which has received one or more message fragments from a previous node along with necessary authentication information. Operation 210 may comprise a network node sending at least one first fragment accompanied by any nodes of the hash tree necessary to authenticate the one or more first sent fragments. Operation 220, which may be carried out until an entire message is sent successfully to a subsequent node, comprises sending one or more subsequent fragments accompanied by only those nodes of the hash tree necessary to authenticate the one or more subsequent fragments and which were not previously sent in conjunction with a prior fragment.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, embodiments of the invention provide several advantages for transmitting a data message over a network such as the system depicted in FIG. 2. For one, unlike the traditional signature list approach on-demand fragmentation may be carried out by intermediary devices, such as a mobile terminal 10. This on-demand fragmentation allows real time decisions to be made by intermediary network nodes as to how to send a message to the next node in the message path depending on network factors, such as the stability of the link over which the message is to be sent. Additionally, as compared to the signature list approach, less work is required by the sender as the sender only has to create one signature as opposed to one signature for each fragment. Also, whereas the signature list approach requires both an intermediary device and a receiver device to execute n computationally expensive signature verifications, where n equals the number of fragments, the improved hash tree approach of embodiments of this invention requires intermediary and receiver devices to perform only one signature verification. As compared to a basic hash tree approach, bandwidth overhead on average is significantly reduced. In a basic hash tree approach each fragment must be accompanied by one signature and $\log_2(n)$ hashes, or each hash in the co-path of the sent fragment. In the improved hash tree approach of embodiments of this invention, however, while the maximum bandwidth overhead is the same as the basic hash tree approach in a worst case scenario, such as an unreliable short-lived unidirectional link, on average the improved hash tree approach yields significant bandwidth advantages over the basic hash tree approach. Such a worst case scenario may only occur when a first fragment is sent. For subsequent fragments, the overhead is always smaller. On average the bandwidth overhead for a single fragment is only 1/n signatures and one hash. Also, if an entire message is sent in one piece then the improved hash tree approach of embodiments of the present invention requires a bandwidth overhead of only 1 signature compared to the n signatures and $\log_2(n)$ hashes required by the basic hash tree approach even when the whole message is sent in one piece. Thus the improved hash tree approach of embodiments of the current invention allows for on-demand fragmentation of data messages to improve the ability to transmit large messages over even short-lived ad-hoc networks while minimizing bandwidth overhead over network links and computational overhead at network nodes.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:

causing at least one first fragment of a plurality of data fragments and any nodes of a hash tree representing the plurality of fragments which are necessary to authenticate the at least one first fragment to be sent from a sender to a receiver;

maintaining, at the sender, a record of nodes of the hash tree that have been sent to the receiver;

determining, by a processor at the sender, one or more nodes of the hash tree which are necessary for the receiver to authenticate a subsequent fragment;

determining based at least in part on the record which, if any, of the one or more nodes necessary to authenticate the subsequent fragment have not already been sent to the receiver; and causing the subsequent fragment and any nodes determined to be necessary for the receiver to authenticate the subsequent fragment that have not already been sent to the receiver, to be sent from the sender to the receiver.

2. A method according to claim 1 further comprising waiting for acknowledgement of receipt of the at least one first fragment by the receiver before causing the subsequent fragment to be sent.

3. A method according to claim 1 further comprising:
determining a condition of a network link prior to sending one or more data fragments; and
deciding one or more of a fragment size of at least one of the plurality of data fragments or whether to send multiple fragments at once based at least in part on the determined condition of the network link.

4. A method according to claim 1, wherein the at least one first fragment and the subsequent fragment are sent over a wireless network.

5. A method according to claim 1, wherein the plurality of data fragments comprise a short message service (SMS) message, a multimedia messaging service (MMS) message, a multimedia file, or other data file.

6. A method according to claim 1, wherein the hash tree is a binary hash tree.

7. A method according to claim 1, wherein causing the at least one first fragment to be sent further comprises causing a signature to be sent with the at least one first fragment.

8. A computer program product comprising at least one non-transitory computer-readable storage medium having computer-readable program code portions stored therein, the computer-readable program code portions comprising:
a program code portion configured to cause at least one first fragment of a plurality of data fragments and any nodes of a hash tree representing the plurality of fragments which are necessary to authenticate the at least one first fragment to be sent from a sender to a receiver;
a program code portion configured to maintain, at the sender, a record of nodes of the hash tree that have been sent to the receiver;
a program code portion configured to determine, at the sender, one or more nodes of the hash tree which are necessary for the receiver to authenticate a subsequent fragment;
a program code portion configured to determine based at least in part on the record which, if any, of the one or more nodes necessary for the receiver to authenticate the subsequent fragment have not already been sent to the receiver; and
a program code portion configured to cause the subsequent fragment and any nodes determined to be necessary for the receiver to authenticate the subsequent fragment that have not already been sent to the receiver to be sent from the sender to the receiver.

9. A computer program product according to claim 8 wherein the program code portion configured to cause the subsequent fragment to be sent includes instructions to wait for acknowledgement of receipt of the at least one first fragment by the receiver before causing the subsequent fragment to be sent.

10. A computer program product according to claim 8 further comprising:
a program code portion configured to determine a condition of a network link prior to sending one or more data fragments; and
a program code portion configured to decide one or more of a fragment size of at least one of the plurality of data fragments or whether to send multiple fragments at once based at least in part on the determined condition of the network link.

11. A computer program product according to claim 8, wherein the at least one first fragment and the subsequent fragment are sent over a wireless network.

12. A computer program product according to claim 8, wherein the hash tree is a binary hash tree.

13. A computer program product according to claim 8, wherein the program code portion configured to cause the at least one first fragment to be sent includes instructions configured to cause a signature to be sent with the at least one first fragment.

14. An apparatus comprising at least one processor and at least one memory storing computer program code, wherein the at least one memory and stored computer program code are configured, with the at least one processor, to cause the apparatus to at least:
cause at least one first fragment of a plurality of data fragments and any nodes of a hash tree representing the plurality of fragments which are necessary to authenticate the at least one first fragment to be sent from a sender to a receiver;
maintain, at the sender, a record of nodes of the hash tree that have been sent to the receiver;
determine, at the sender, one or more nodes of the hash tree which are necessary for the receiver to authenticate a subsequent fragment;
determine, based at least in part on the record, which, if any, of the one or more nodes necessary for the receiver to authenticate the subsequent fragment have not already been sent to the receiver; and
cause the subsequent fragment and any nodes determined to be necessary for the receiver to authenticate the subsequent fragment that have not already been sent to the receiver to be sent from the sender to the receiver.

15. An apparatus according to claim 14 wherein the at least one memory and stored computer program code are configured, with the at least one processor, to further cause the apparatus to wait for acknowledgement of receipt of the at least one first fragment before sending the subsequent fragment.

16. An apparatus according to claim 14 wherein the at least one memory and stored computer program code are configured, with the at least one processor, to further cause the apparatus to:
determine a condition of a network link prior to sending one or more data fragments; and
decide one or more of a fragment size of at least one of the plurality of data fragments or whether to send multiple fragments at once based at least in part on the determined condition of the network link.

17. An apparatus according to claim 14, wherein the at least one memory and stored computer program code are configured, with the at least one processor, to further cause the apparatus to cause the at least one first fragment and the subsequent fragment to be sent over a wireless network.

18. An apparatus according to claim 14, wherein the plurality of data fragments comprise a short message service (SMS) message, a multimedia messaging service (MMS) message, a multimedia file, or other data file.

19. An apparatus according to claim 14, wherein the hash tree is a binary hash tree.

20. An apparatus according to claim 14, wherein the at least one memory and stored computer program code are configured, with the at least one processor, to further cause the apparatus to cause a signature to be sent with the at least one first fragment.

21. An apparatus according to claim 14, wherein the apparatus comprises or is embodied on a mobile phone, the mobile phone comprising user interface circuitry and user interface software stored on one or more of the at least one memory; wherein the user interface is configured to:

facilitate user control of at least some functions of the mobile phone through use of a display; and cause at least a portion of a user interface of the mobile phone to be displayed on the display to facilitate user control of at least some functions of the mobile phone.

22. An apparatus comprising:

means for causing at least one first fragment of a plurality of data fragments and a hash tree representing the plurality of fragments which are necessary to authenticate the at least one first fragment to be sent from a sender to a receiver;

means for maintaining, at the sender, a record of nodes of the hash tree that have been sent to the receiver, means for determining, at the sender, one or more nodes of the hash tree which are necessary for the receiver to authenticate a subsequent fragment, means for determining, based at least in part on the record, which, if any, of the one or more nodes necessary for the receiver to authenticate the subsequent fragment have not already been sent to the receiver; and means for causing the subsequent fragment and any nodes determined to be necessary for the receiver to authenticate the subsequent fragment that have not already been sent to the receiver to be sent from the sender to the receiver.

* * * * *